US008433786B2

(12) United States Patent
Agrawal et al.

(10) Patent No.: US 8,433,786 B2
(45) Date of Patent: Apr. 30, 2013

(54) SELECTIVE INSTRUMENTATION OF DISTRIBUTED APPLICATIONS FOR TRANSACTION MONITORING

(75) Inventors: Dakshi Agrawal, Monsey, NY (US); Animashree Anandkumar, Cambridge, MA (US); Chatschik Bisdikian, Chappaqua, NY (US); Ting He, Ossining, NY (US); Shoel Perelman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/484,240

(22) Filed: Jun. 14, 2009

(65) Prior Publication Data

US 2010/0318648 A1      Dec. 16, 2010

(51) Int. Cl.
*G06F 15/173*      (2006.01)
*G06F 7/38*      (2006.01)

(52) U.S. Cl.
USPC ........................................... 709/224; 712/227

(58) Field of Classification Search ................... 709/220, 709/201, 219, 217, 218, 247–249, 238, 232, 709/224, 226, 203, 245; 707/501, 505, 610, 707/513; 705/21, 37–69; 706/40–49

See application file for complete search history.

(56) References Cited

U.S. PATENT DOCUMENTS

| | | | |
|---|---|---|---|
| 2004/0107125 A1* | 6/2004 | Guheen et al. | 705/7 |
| 2004/0117239 A1* | 6/2004 | Mittal et al. | 705/10 |
| 2006/0184445 A1* | 8/2006 | Sandor et al. | 705/37 |
| 2007/0016831 A1* | 1/2007 | Gehman et al. | 714/43 |
| 2009/0171703 A1* | 7/2009 | Bobak et al. | 705/7 |
| 2009/0193112 A1* | 7/2009 | Sengupta et al. | 709/224 |

* cited by examiner

*Primary Examiner* — Joseph Avellino
*Assistant Examiner* — Mark O Afolabi
(74) *Attorney, Agent, or Firm* — August, Law, LLC; George Willinghan

(57) ABSTRACT

Systems and methods provide a selective instrumentation strategy for monitoring the progress of transactions in a distributed computing system. The monitoring of the transactive processing of jobs is considered through a collection of computer operating stages in a distributed system, using limited information. The monitoring is performed by observing log records (or footprints) produced during each stage of processing in the system. The footprints lack unique transaction identifiers resulting in uncertainties in monitoring transaction instances. The processing stages are selective instrumented to reduce monitoring uncertainty under the given constraints such as limited budget for instrumentation cost.

22 Claims, 3 Drawing Sheets

SELECTIVE INSTRUMENTATION OF DISTRIBUTED APPLICATIONS FOR TRANSACTION MONITORING

FIELD OF THE INVENTION

The present invention relates to monitoring transactions in applications across distributed systems.

BACKGROUND OF THE INVENTION

Historically, customer service utilized a well-trained staff that would listen, answer questions and help customers make decisions. Today, companies expose their data, i.e., products and services, to customers in innovative ways through websites that facilitate self-service by the customers. Enterprise IT infrastructure is used to manage the data and provide the desired products and services to the customers.

In order to monitor the performance of such IT infrastructure, individual "endpoints," that is, servers, storage and network devices and applications are monitored. The "health" of these endpoints is monitored in terms of metrics such as abnormal resource utilization and response time. While monitoring individual endpoints usually covers systematic problems, situations arise where all endpoints appear to be running well and customer complaints occur regarding an end-user application. These complaints may not indicate any obvious statistical patterns that point to a particular application or device. In such cases, it is necessary to go through logs and other monitoring data in detail and monitor the performance and other characteristics of each unsatisfactory customer transaction as it makes its way through various applications in the system hoping that helpful trends will emerge.

If each transaction had a unique identifier, and if this identifier was recorded in all system and application logs and other monitoring data, then tracking a transaction instance through various applications in the system would be easy. However, this rarely is the case. Instead each portion of an application uses its own identifier for the transactions it serves. The key then is to locate footprints of a given transaction instance (i.e., log records attributed to a specific transaction instance) as it travels through the system without relying on a unique identifier.

An alternative to a system-wide unique transaction identifier is link instrumentation where additional instrumentation is retrofitted between successive applications along the path of a transaction so that transaction footprints in one application on the transaction path can lead to transaction footprints in the subsequent application that comes later. If all links were so instrumented, then starting with the entry point of a transaction into the system, transaction footprints can be located in all the applications traversed by the transaction. However, in reality, one needs to budget and decide which links to instrument and which links to leave for manual matching of footprints.

When a component, e.g., web-server, application server, Lightweight Directory Access Protocol (LDAP) or authentication server, of a distributed application, e.g., shopping sessions in an e-business or new identification (ID) creation processes in an enterprise, does processing of a transaction, that component typically generates at least one log record that indicates a status of the transaction. For example, in the case of an authentication server, a single record per transaction is generated indicating access denied or access permitted.

Unfortunately, transaction monitoring in a distributed application often cannot be implemented directly because the distributed application does not have a unique transaction ID that is maintained through all components of the distributed application and that is included in all log records. In the absence of a unique transaction ID, monitoring a given transaction involves probabilistic calculations that are based on information such as overall traffic flow patterns and aggregate statistics of time spent in each state.

As a result, the estimate of the progress of a transaction in a distributed application can be quite loose, and the usefulness of that estimate for purposes such as debugging a transaction is limited. In order to improve estimates of the progress of a transaction in a distributed application, components of the application are often retrofitted with instrumentation that will allow a unique transaction ID to appear in the logs of instrumented application components. However, retrofitting existing applications with instruments is both costly and error-prone since it requires modifying existing systems. Given the above issues, it is desirable to have methods that guide the selective instrumentation procedure to balance the costs and the risks associated with instrumentation and monitoring performance.

SUMMARY OF THE INVENTION

Exemplary embodiments of the present invention are directed to systems and methods to judiciously select applications to instrument and to take a hybrid approach to transaction monitoring by using information from both instrumented and un-instrumented applications to achieve desired balance between benefits, e.g., better monitoring accuracy, and costs, e.g., instrumentation cost.

The present invention uses as input a model for the transaction, which includes a set of states that a transaction instance can pass through during its execution, relationships among the states, e.g., state B is executed after state A and then state C or D is executed depending on the outcome of B, a set of observable "footprints", e.g., log records, generated by transactions at each state, and a set of constraints, e.g., budget, accuracy, on selecting which states to instrument.

A method in accordance with exemplary embodiments of the present invention judiciously selects a set of states whose instrumentation will improve transaction monitoring in terms of one or more pre-defined desirable benefits, e.g., lower cost or higher accuracy, under the given constraints. Collections of states are identified that satisfy the given constraints, and a subset of these states is selected in accordance with a pre-determined algorithm that yields a significant benefit once instrumented.

After instrumenting the states selected by the algorithms, transaction monitoring is easily implemented for the distributed application since each transaction instance has a unique identification (ID) to allow tracking, i.e., active monitoring, in the instrumented states, and for the remaining states, the monitoring is based on aggregate knowledge of the transaction behavior, e.g., statistics on the residence times and transition probabilities at the states, in combination with the observed footprints, i.e., passive monitoring.

In one embodiment, the present invention is directed to a method for instrumenting an application across a distributed system. A collection of subsystems from a plurality of subsystems within a distributed system containing the plurality of subsystems are instrumented. Each subsystem within the distributed system is traversed by transactions processed by an application utilizing the distributed system to process transactions. Instrumenting a given subsystem modifies that subsystem to include a sufficient amount of transaction monitoring to monitor specific transactions traversing that subsystem. In addition, the collection of subsystems includes a subset of the plurality of subsystems. This subset is chosen such that a cost associated with instrumenting the collection of subsystems is within a pre-defined cost budget and a desired reduction in transaction monitoring uncertainty in the distributed system that is attributable to the instrumentation of the collection of subsystems is achieved.

In another embodiment of instrumenting an application across a distributed system, a plurality of collections of subsystems within a distributed system containing the plurality of subsystems is identified. Each subsystem within the distributed system is traversed by transactions processed by an application utilizing the distributed system to process transactions, and each subsystem within a given collection of subsystems has a cost associated with instrumenting that subsystem to include a sufficient amount of transaction monitoring to monitor specific transactions traversing that subsystem that is within a pre-defined cost budget. Each one of the plurality of collections is partitioned into a plurality of subcollections, and for each subcollection a reduction in transaction monitoring uncertainty in the distributed system attributable to instrumentation of the subsystems in that subcollection is calculated.

A total uncertainty reduction for each one of the plurality of collections is calculated as a function of the uncertainty reductions for each subcollection within that collection, and the collection having the greatest total uncertainty reduction is selected. The subsystems within the selected collection are instrumented.

In one embodiment, the step of partitioning each one of the plurality of collections includes partitioning each one of the plurality of collections such that none of the subsystems in any two subcollections share a common predecessor subsystem. In one embodiment, the function of the uncertainty reductions is a sum of the uncertainty reductions of each subcollection within that collection. Partitioning the collections into subcollections includes partitioning each collection into the largest number of subcollections or partitioning such that no single subsystem is contained in more than one subcollection of a given collection.

In one embodiment, the cost associated with instrumenting is a monetary cost, a man-hour based cost, a time-based cost or combinations thereof. Instrumenting a given subsystem includes modifying at least one of an input to that subsystem or an output to that subsystem to associate a unique identifier to each transaction traversing that subsystem.

Exemplary embodiments of the present invention are also directed to a method for instrumenting an application across a distributed system that includes identifying a plurality of collections of subsystems within a distributed system containing a plurality of subsystems. Each subsystem within the distributed system is traversed by transactions processed by an application utilizing the distributed system to process transactions. Each one of the plurality of collections is partitioned into a plurality of subcollections, and for each subcollection a reduction in transaction monitoring uncertainty in the distributed system attributable to instrumentation of the subsystems in that subcollection is calculated. A total uncertainty reduction is calculated for each one of the plurality of collections as a function of the uncertainty reductions for each subcollection within that collection, and for each collection a total cost associated with instrumenting each subsystem within that collection to include a sufficient amount of transaction monitoring to monitor specific transactions traversing that subsystem is calculated. The collection having the greatest total uncertainty reduction and a total cost within a pre-defined cost budget is instrumented.

DETAILED DESCRIPTION

Figure 1:
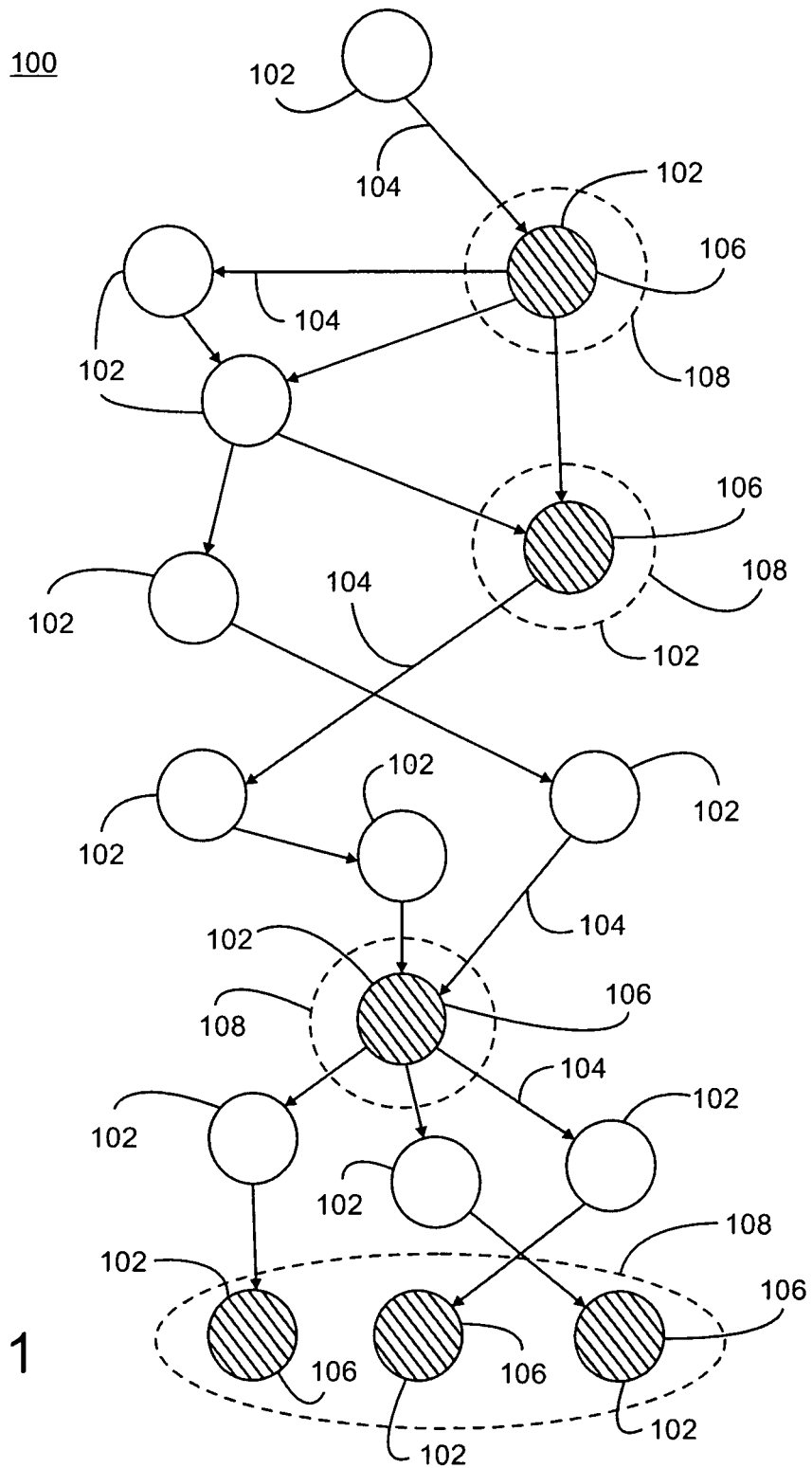
FIG. 1 is a state-transition diagram illustrating an embodiment of a distributed system for instrumenting in accordance with the present invention.

Referring initially to FIG. 1, a representation of a distributed system 100 that is used by one or more applications to process transactions is illustrated. Suitable applications to be executed using the distributed system include any service that can be provided, for example, in a computer-based or network-based environment such as wide area networks, i.e., the Internet, local area networks and single domain computing systems. Examples of the applications include, but are not limited to, E-commerce or web-based sales, web-based technical support, web-based government services and stock processing in financial transactions. The application can be a single application or computer program that is executed on a plurality of nodes or subsystems within the distributed system. Alternatively, the application is constructed from a plurality of separate or independent applications or computer programs that are running on a plurality of nodes or subsystems within the distributed system.

An application is accessed by a client or customer via a suitable interface such as a computer, terminal, server or portable device in communication with the distributed computing system. The customer initiates an instance of a transaction in the application, e.g., a purchase or request for membership or services. This transaction is processed by the application through the distributed system. In order to process the transaction, the application utilizes a plurality of subsystems 102 in the distributed system. The subsystems are illustrated as a plurality of states in a state-transition diagram. For a web-based sales application, the subsystems or states include searching a database of products, populating a shopping basket, secure check-out and credit cart verification, among others.

The links 104 between the states illustrate the paths of transactions through the application. A given transaction does not necessary traverse through each subsystem.

As illustrated in FIG. 1, a given distributed system, i.e., application, through which a transaction passes is modeled using a state-transition diagram, where each state represents a subsystem 102 or an application traversed by that transaction.

For every transaction that passes through it, each state maintains an entry log-record that contains the time of entry of that transaction into that state. Thus, the minimal information provided by the logs in the distributed system through which each transaction passes is a record of arrival times of the transactions at each of the states. Initially the distributed system does not contain any link instrumentation. After a link is instrumented, it is possible to precisely track all the transactions going from the one state to the next at the end-points of the instrumented link using unique identifiers corresponding to the transactions.

Absent instrumentation, the difficulty in matching footprints belonging to the same transaction in two consecutive states is the result of uncertainties introduced by out-of-order progress of transactions from one state to another. Maximum-likelihood (ML) and first-in first-out (FIFO) techniques for correlating transaction footprints have been suggested. These automated matching techniques yield a correct match within a certain probability. In the case of a match failure, the transaction footprints in the two states are manually combed to correctly match them using other attributes. The manual effort required for correlating transaction footprints differs from link to link.

After instrumentation is applied to a given transition link, transaction footprints in the two states connected by that given link can be correlated perfectly. However, there is a cost associated with retrofitting instrumentation to each transition link in a distributed system. Therefore, exemplary embodiments of systems and methods in accordance with the present invention instrument links between states within a given cost budget constraint such that the desired performance objectives of the application are achieved, for example, a reduction in the uncertainty associated with the monitoring of a transaction or the minimization of the overall manual effort in transaction footprint correlation.

The load factor of a queue is the ratio of the average arrival rate to the average service rate. Intuitively, a higher load factor for an infinite-server queue leads to a higher number of transactions being simultaneously serviced, introducing a higher uncertainty to monitoring. Therefore, in one exemplary embodiment, a simple heuristic is to instrument links in the reverse order of their load factors.

Exemplary embodiments of the present invention provide sufficient conditions for the optimality of the load-factor heuristic under different service distributions and automated policies for matching log-records. For the cases where these conditions are not satisfied, the matching accuracies are approximately evaluated, which is efficient in the low arrival-rate regime.

In one embodiment, matching rules are considered, e.g., first-in first-out (FIFO) and random matching. Under FIFO matching rules, when the service times normalized by their arrival rates and the "spread" or variability of the respective normalized service times satisfy the same stochastic order, then the load-factor heuristic is optimal. Under random matching rules, a stochastic order on the normalized service times along with a mild condition on their support (the range of values that they can take) is sufficient to establish the optimality of the load-factor heuristic. For the special case when all the service distributions belong to the same family, the load-factor heuristic is always guaranteed to be optimal, and no additional conditions are needed.

Figure 2:
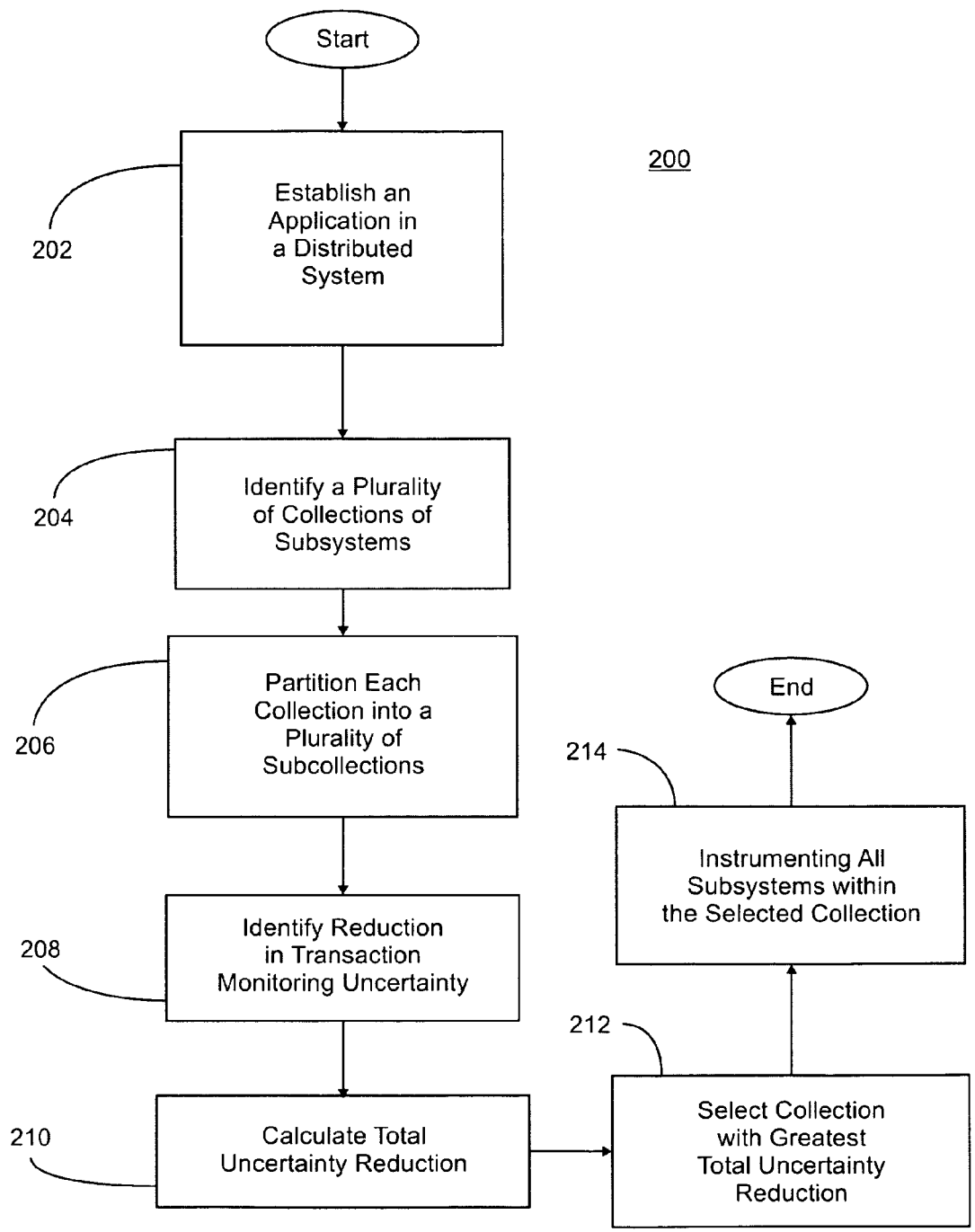
FIG. 2 is a flow-chart illustrating an embodiment of instrumenting a distributed system in accordance with the present invention.

Referring to FIG. 2, an exemplary embodiment of a method for instrumenting an application across a distributed system 200 in accordance with the present invention is illustrated. The instrumentation in accordance with the present invention is used to monitor or to track transactions that are processed through applications that utilize a distributed system to process transactions such as the applications discussed above. Initially, an application is established in a distributed system that contains a plurality of subsystems 202. A suitable distributed system represented by a state transition model is illustrated in FIG. 1.

A collection of subsystems from a plurality of subsystems within the distributed system are instrumented. This instrumentation involves the modification of subsystems to provide for the tracking of transactions that traverse through the subsystems while being processed by the application. Instrumenting a given subsystem modifies that subsystem to include a sufficient amount of transaction monitoring to monitor specific transactions traversing that subsystem. The modification of subsystems includes the addition or modification of computer programs or computer codes that are resident on and executed by the subsystems. In general, the subsystems include instances of computer programs and computer applications that provide the required or desired subsystem functionality. In one embodiment, these computer programs are legacy programs. In another embodiment, the additional or modified code provides for the association or assignment of a unique identifier to each transaction that traverses the subsystem. This unique identifier can be used to associate the log entries for the subsystem with a specific transaction so that the transaction can be tracked or monitored. For example, the instrumentation can be used to determine in which subsystem a specific transaction is currently located.

A given subsystem can be instrumented at various points during the processing of a transactions. Preferably, instrumentation is provided in at least one of the inputs to or the outputs from the subsystem. Therefore, instrumentation is provided at the interfaces or links between subsystems. The distributed system used by a given application includes a plurality of subsystems. Each subsystem within the distributed system is traversed by transactions processed by the application utilizing the distributed system to process transactions. The collection of subsystems represents a subset of the plurality of subsystems. Therefore, the collection of subsystems represents only a portion, i.e., less than all, of the subsystems within the distributed system. This collection or subset is chosen to achieve the desired balance between the cost associated with instrumentation and the achievement of certain transaction monitoring performance parameters. In one embodiment, the collection is selected such that a cost associated with instrumenting one or more of the subsystems within the collection of subsystems are within a pre-defined cost budget and a desired reduction in transaction monitoring uncertainty in the distributed system that is attributable to the instrumentation of the collection of subsystems is achieved.

Having established or identified an application in a distributed system, a plurality of collections of subsystems within a distributed system are identified 204. Each collection includes a different plurality of subsystems, and each subsystem within the distributed system is traversed by transactions processed by an application utilizing the distributed system to process transactions. Preferably, each collection of subsystems represents only a portion of the total number of subsystems in the distributed system. One such collection is illustrated in FIG. 1 as a collection of six subsystems 106 identified from within the distributed system.

In one embodiment, the subsystems within a given collection can be chosen randomly. Alternatively, the subsystems within a given collection are chosen based upon the ability of those identified subsystems either individually or collectively to meet one or more criteria such as cost or monitoring criteria. In one embodiment, each subsystem within a given collection of subsystems has a cost associated with instrumenting that subsystem to include a sufficient amount of transaction monitoring to monitor specific transactions traversing that subsystem that is within a pre-defined cost budget.

The costs associated with instrumenting a given subsystem include the costs associated with making the desired modifications to that subsystem. In one embodiment, the cost associated with instrumenting includes a monetary cost, i.e., the amount of money required to make the necessary changes to the subsystem, a man-hour based cost, i.e., the amount of man-hours, for example programmer time, required to make the desired changes or modifications to the subsystem, a time-based cost, i.e., the amount or length of time required to make the desired changes, and combinations thereof. In one embodiment, the time-based cost expresses the cost in terms of the time, e.g., hours, weeks or months, required to perform the desired instrumentation as opposed to the man-hour based cost which expresses cost in terms of man hours. For example, if a given instrumentation requires 20 man-hours, and five technicians work on the project simultaneously, the time-based cost would be 4 hours. The time-based cost could also express a total time required to perform the desired instrumentation or a processing resource usage time.

The costs can also take into account the idea of diminishing returns. For example, a given cost can express the marginal cost of instrumenting a subsystem versus the marginal gain in monitoring of transactions provided by that instrumentation.

Having identified a plurality of collections of subsystems, each one of the plurality of collections are partitioned into a plurality of subcollections 206. In one embodiment, the subcollections are created such that none of the subsystems in any two subcollections share a common predecessor subsystem. In another embodiment, each subcollection comprises of a single subsystem. In yet another embodiment, the entire collection comprises of a single subcollection, i.e., in this case, the step of further partitioning a collection is only logically executed. This is illustrated in FIG. 1, where the collection subsystems 106 are grouped into subcollections 108 containing one or more subsystems each. None of the subcollections contain a common predecessor subsystem; however, one subsystem in a given subcollection can have a subsystem in another subcollection as a predecessor. Preferably, each collection is partitioned into the largest number of subcollections up to a number of subcollections equal to the number of subsystems in the collection. Therefore, each subcollection includes just one subsystem. In general, no single subsystem is contained in more than one subcollection of a given collection.

For each subcollection in a given collection, a reduction in transaction monitoring uncertainty in the distributed system attributable to instrumentation of the subsystems in that subcollection is identified 208. Therefore, if all of the subsystems in that subcollection are instrumented to provide for transaction monitoring, i.e., by assigning a unique identification to each transaction, then those transactions can be monitored or tracked with certainty. The reduction in transaction uncertainty quantifies the increase in certainty or decrease in uncertainty that results from this instrumentation.

A total uncertainty reduction is calculated for each one of the plurality of collections 210. The total uncertainty reduction is a function of the uncertainty reductions for each subcollection within that collection. For each one of the plurality of collections, a total uncertainty reduction is calculated from the uncertainty reductions from each subcollection in that collection 210. In one embodiment, the total uncertainty reduction for a collection, $UR_c$, is computed from the uncertainty reductions of each subcollections in collection, $UR_{sc,1}$, $UR_{sc,2}, \ldots, UR_{sc,N}$, where N is the number of subcollections in the collection. Different collections may be partitioned to a different number of subcollections. In one embodiment, the total uncertainty reduction is calculated from the sum of the uncertainty reductions of all of the subcollections, i.e., $UR_c=\text{sum}(U_{sc,1}, U_{sc,2}, \ldots, U_{sc,N})$. In another embodiment, $UR_c=\text{weightedAverage}(w_1UR_{sc,1}, w_2UR_{sc,2}, \ldots, w_NUR_{sc,N})$, where the weights $w_i$ represent levels of importance, for example, a higher importance may be placed on reducing uncertainty in a credit authentication operation rather than in a printout operation, cost and other factors, for a subcollection. In another embodiment, $UR_c=\max(UR_{sc,1}, UR_{sc,2}, \ldots, UR_{sc,N})$, or $\min(UR_{sc,1}, UR_{sc,2}, \ldots, UR_{sc,N})$. In general, $UR_c=f_N(UR_{sc,1}, UR_{sc,2}, \ldots, UR_{sc,N})$, where $f_N(\bullet)$ is a function of N variables, such that it is non-decreasing in each of its variables. In an embodiment where partitioned subcollections do not share a common predecessor, a total uncertainty reduction can be calculated from the sum of the uncertainty reductions for each subcollection within that collection, i.e., $f_N(\bullet)=\text{sum}(\ldots)$.

The collection in the plurality of identified collections having the greatest total uncertainty reduction is selected 212, and the subsystems within the selected collection are instrumented 214. Preferably, at least one of an input to each subsystem or an output to each subsystem is instrumented to associate a unique identifier to each transaction traversing that subsystem. Therefore, the appropriate amount of instrumentation is provided in the distributed system to maintain the desired cost budget while achieving a desired improvement in transaction monitoring uncertainty reduction.

In the previous embodiment, the subsystems were initially collected according to a pre-defined cost budget constraint, and then the identified collections were arranged according to the ability of those subsystems in the collections to be instrumented to achieve a desired monitoring performance goal, e.g., uncertainty reduction. In another embodiment, the subsystems are collected according to the ability of the collections to meet the desired monitoring performance goal, and then the collections are sorted according to cost.

Figure 3:
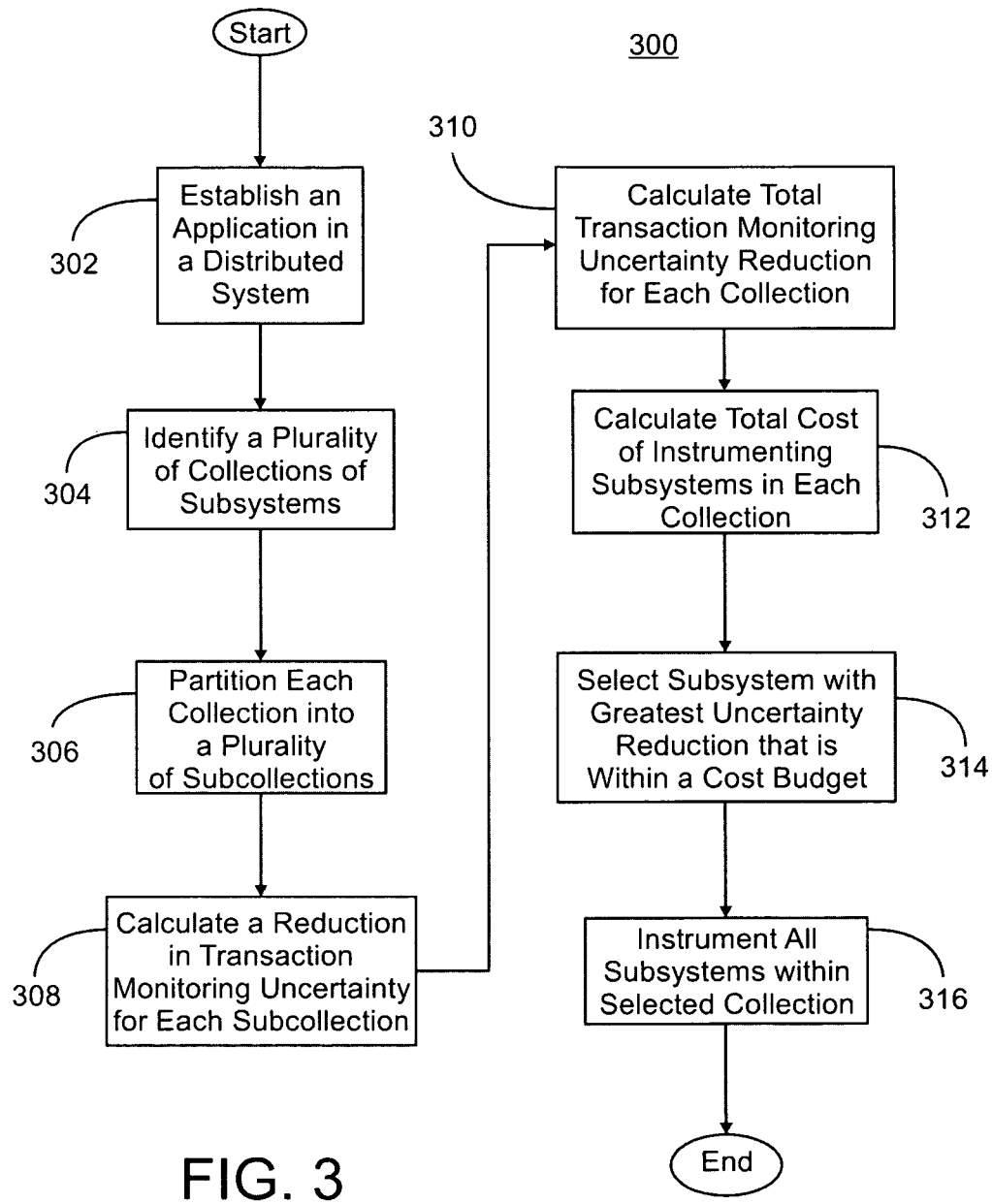
FIG. 3 is a flow-chart illustrating another embodiment of instrumenting a distributed system in accordance with the present invention.

Referring to FIG. 3, an exemplary embodiment of instrumenting an application across a distributed system 300 in accordance with the present invention is illustrated. An application is established in a distributed system 302, and a plurality of collections of subsystems within the distributed system is identified 304. The subsystems in each collection are not selected based on the cost of instrumentation but using other criteria or can be selected randomly. Having identified the collections, each one of the plurality of collections is partitioned into a plurality of subcollections such that none of the subsystems in any two subcollections share a common predecessor subsystem 306.

For each subcollection a reduction in transaction monitoring uncertainty in the distributed system attributable to instrumentation of the subsystems in that subcollection is computed 308. A total uncertainty reduction for each one of the plurality of collections is calculated as a function of the uncertainty reductions for each subcollection within that collection 310. For each collection, a total cost associated with instrumenting each subsystem within that collection to include a sufficient amount of transaction monitoring to monitor specific transactions traversing that subsystem is calculated 312, and the collection having the greatest total uncertainty reduction and a total cost within a pre-defined cost budget is selected 314. Preferably, the collection having the greatest uncertainty reduction and the lowest total cost is selected. The subsystems within the selected collection are instrumented 316. Therefore, either accuracy of transaction monitoring, i.e., uncertainty reduction, or cost reduction can be used as the driving constraint.

In an alternative embodiment, a more general approximation of cost reduction and uncertainty reduction can be used. In this embodiment, a cost for instrumentation and a transaction monitoring uncertainty reduction value is calculated for each subsystem in the distributed system. For each subsystem, a benefit-constraint ratio, e.g., uncertainty reduction and cost budget, is calculated for each subsystem using the calculated values. All of the subsystems are then ranked individually based on the benefit-cost ratio and the highest ranked subsystems above a pre-defined ranking threshold that meet a pre-defined cost budget constraint are instrumented.

Systems and methods in accordance with exemplary embodiments of the present invention select portions of an end-to-end, transactional application executed over a distributed, non-homogenous system to instrument. The portions, e.g., subsystems, to be instrumented represent operational states of the processing phases of a given class transactions. This selection is done under resource constraints, e.g., cost of instrumenting, for the purpose of reducing uncertainty in monitoring the performance of transactions executed by the system. This is uncertainty that results from the lack of prior instrumentation in the application. Therefore, the instrumentation of entire applications to support transaction tracking across applications is addressed with the objective to improve the accuracy of tracking or to reduce the instrumentation cost. This objective is achieved while satisfying a constraint that is either a maximum instrumentation cost (for improving the accuracy) or a required accuracy (for reducing the cost).

The operation of interest is to support transaction monitoring, and the motivation is to achieve a good balance between monitoring performance and instrumentation cost. Systems and methods in accordance with the present invention address the monitoring of business transactions across distributed applications, where the challenge is to identify processes in these applications generated by the same transaction and the selection of a subset of applications such that associating transaction ID's with transaction instances passing through these applications, i.e., instrumentation, results in a desirable tradeoff between the benefit to transaction monitoring and the instrumentation cost.

In one embodiment, instrumentation alone is used to monitor transactions in the distributed system. Alternatively, hybrid monitoring is used. In hybrid monitoring, selective instrumentation or instrumented footprints are used to reduce uncertainty and to monitor transactions traversing the instrumented subsystems. In addition, standard tools, e.g., FIFO and manual matching, are used to provide for monitoring of transactions in the subsystems that are not instrumented. These standard tools use aggregated knowledge about the transaction processing to resolve any remaining uncertainty.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for instrumenting an application across a distributed system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

The invention claimed is:

1. A method for instrumenting an application across a distributed system, the method comprising:
   instrumenting a collection of subsystems from a plurality of subsystems within a distributed system comprising the plurality of subsystems, each subsystem within the distributed system comprising a state of an application utilizing the distributed system to process transactions and each state traversed by the transactions processed by the application, wherein instrumenting a given subsystem modifies at least one of inputs to or outputs from that subsystem to include a sufficient amount of transaction monitoring to monitor transaction instances traversing that subsystem by assigning a unique identification to each transaction instance to allow active monitoring only in the collection of subsystems and the collection of subsystems comprises a subset of the plurality of subsystems, the subset chosen such that a cost associated with instrumenting the collection of subsystems is within a pre-defined cost budget and a desired reduction in transaction monitoring uncertainty in the distributed system that is attributable to the instrumentation of the collection of subsystems is achieved, the inputs to and outputs from subsystems comprising links between states of the application.

2. A method for instrumenting an application across a distributed system, the method comprising:

identifying a plurality of collections of subsystems within a distributed system comprising a plurality of subsystems, each subsystem within the distributed system comprising a state of an application utilizing the distributed system to process transactions, each state traversed by the transactions processed by the application and each subsystem within a given collection of subsystems having a cost associated with instrumenting at least one of inputs to or outputs from that subsystem to include a sufficient amount of transaction monitoring to monitor transaction instances traversing that subsystem by assigning a unique identification to each transaction instance to allow active monitoring only in the collection of subsystems that is within a pre-defined cost budget, the inputs to and outputs from subsystems comprising links between states of the application;

partitioning each one of the plurality of collections in a plurality of subcollections;

computing for each subcollection a reduction in transaction monitoring uncertainty in the distributed system attributable to instrumentation of the subsystems in that subcollection;

calculating a total uncertainty reduction for each one of the plurality of collections as a function of the uncertainty reductions for each subcollection within that collection;

selecting the collection having the greatest total uncertainty reduction; and instrumenting the subsystems within the selected collection.

3. The method of claim 2, wherein the step of partitioning each one of the plurality of collections further comprises partitioning each one of the plurality of collections such that none of the subsystems in any two subcollections share a common predecessor subsystem.

4. The method of claim 2, wherein the function of the uncertainty reductions comprises a sum of the uncertainty reductions of each subcollection within that collection.

5. The method of claim 2, wherein the step of partitioning the collections into subcollections further comprises partitioning each collection into the largest number of subcollections.

6. The method of claim 2, wherein no single subsystem is contained in more than one subcollection of a given collection.

7. The method of claim 2, wherein the cost associated with instrumenting comprises at least one of a monetary cost, a man-hour based cost, a time-based cost and combinations thereof.

8. The method of claim 2, wherein monitoring is based on aggregate knowledge of transaction behavior in states located in subsystems outside the collection of subsystems.

9. A method for instrumenting an application across a distributed system, the method comprising:

identifying a plurality of collections of subsystems within a distributed system comprising a plurality of subsystems, each subsystem within the distributed system comprising a state of an application utilizing the distributed system to process transactions and each state traversed by the transactions processed by the application;

partitioning each one of the plurality of collections into a plurality of subcollections;

computing for each subcollection a reduction in transaction monitoring uncertainty in the distributed system attributable to instrumentation of at least one of inputs to or outputs from the subsystems in that subcollection;

calculating a total uncertainty reduction for each one of the plurality of collections as a function of the uncertainty reductions for each subcollection within that collection;

calculating for each collection a total cost associated with instrumenting each subsystem within that collection to include a sufficient amount of transaction monitoring to monitor transaction instances traversing that subsystem by assigning a unique identification to each transaction instance to allow active monitoring only in the collection of subsystems;

instrumenting the collection having the greatest total uncertainty reduction and a total cost within a pre-defined cost budget.

10. The method of claim 9, wherein the step of partitioning each one of the plurality of collections further comprises partitioning each one of the plurality of collections such that none of the subsystems in any two subcollections share a common predecessor subsystem.

11. The method of claim 9, wherein the function of the uncertainty reductions comprises a sum of the uncertainty reductions of each subcollection within that collection.

12. The method of claim 9, wherein the step of partitioning the collections into subcollections further comprises partitioning each collection into the largest number of subcollections.

13. The method of claim 9, wherein no single subsystem is contained in more than one subcollection of a given collection.

14. The method of claim 9, wherein the cost associated with instrumenting comprises at least one of a monetary cost, a man-hour based cost, a time-based cost and combinations thereof.

15. The method of claim 9, wherein monitoring is based on aggregate knowledge of transaction behavior in states located in subsystems outside the collection of subsystems.

16. A non-transitory computer-readable medium containing a computer-readable code that when read by a computer causes the computer to perform a method for instrumenting an application across a distributed system, the method comprising:

identifying a plurality of collections of subsystems within a distributed system comprising a plurality of subsystems, each subsystem within the distributed system comprising a state of an application utilizing the distributed system to process transactions, each state traversed by the transactions processed by the application and each subsystem within a given collection of subsystems having a cost associated with instrumenting at least one of inputs to or outputs from that subsystem to include a sufficient amount of transaction monitoring to monitor transaction instances traversing that subsystem by assigning a unique identification to each transaction instance to allow active monitoring only in the collection of subsystems that is within a pre-defined cost budget, the inputs to and outputs from subsystems comprising links between states of the application;

partitioning each one of the plurality of collections in a plurality of subcollections;

computing for each subcollection a reduction in transaction monitoring uncertainty in the distributed system attributable to instrumentation of the subsystems in that subcollection;

calculating a total uncertainty reduction for each one of the plurality of collections as a function of the uncertainty reductions for each subcollection within that collection;

selecting the collection having the greatest total uncertainty reduction; and instrumenting the subsystems within the selected collection.

17. The non-transitory computer-readable medium of claim 16, wherein the step of partitioning each one of the plurality of collections further comprises partitioning each one of the plurality of collections such that none of the subsystems in any two subcollections share a common predecessor subsystem.

18. The non-transitory computer-readable medium of claim 16, wherein the function of the uncertainty reductions comprises a sum of the uncertainty reductions of each subcollection within that collection.

19. The non-transitory computer-readable medium of claim 16, wherein the step of partitioning the collections into subcollections further comprises partitioning each collection into the largest number of subcollections.

20. The non-transitory computer-readable medium of claim 16, wherein no single subsystem is contained in more than one subcollection of a given collection.

21. The non-transitory computer-readable medium of claim 16, wherein the cost associated with instrumenting comprises at least one of a monetary cost, a man-hour based cost, a time-based cost and combinations thereof.

22. The non-transitory computer-readable medium of claim 16, wherein monitoring is based on aggregate knowledge of transaction behavior in states located in subsystems outside the collection of subsystems.

* * * * *